United States Patent
Komurasaki et al.

(10) Patent No.: US 11,572,465 B2
(45) Date of Patent: Feb. 7, 2023

(54) FLUORORUBBER COMPOSITION AND FLUORORUBBER SEALING MATERIAL

(71) Applicant: NOK CORPORATION, Tokyo (JP)

(72) Inventors: Hideto Komurasaki, Kumamoto (JP); Shingo Kawano, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 162 days.

(21) Appl. No.: 16/496,956

(22) PCT Filed: May 29, 2018

(86) PCT No.: PCT/JP2018/020620
§ 371 (c)(1),
(2) Date: Sep. 23, 2019

(87) PCT Pub. No.: WO2018/230336
PCT Pub. Date: Dec. 20, 2018

(65) Prior Publication Data
US 2021/0102056 A1   Apr. 8, 2021

(30) Foreign Application Priority Data

Jun. 12, 2017  (JP) .............................. JP2017-115390

(51) Int. Cl.
| | |
|---|---|
| *C08L 27/18* | (2006.01) |
| *C08K 5/00* | (2006.01) |
| *C08K 5/101* | (2006.01) |
| *C08K 5/13* | (2006.01) |
| *C08K 5/20* | (2006.01) |
| *C08K 5/521* | (2006.01) |
| *C08L 27/12* | (2006.01) |
| *C09K 3/10* | (2006.01) |
| *C08L 27/16* | (2006.01) |

(52) U.S. Cl.
CPC ............ *C08L 27/18* (2013.01); *C08K 5/0025* (2013.01); *C08K 5/101* (2013.01); *C08K 5/13* (2013.01); *C08K 5/20* (2013.01); *C08K 5/521* (2013.01); *C08L 27/12* (2013.01); *C08L 27/16* (2013.01); *C09K 3/10* (2013.01); *C08L 2203/30* (2013.01); *C08L 2205/025* (2013.01)

(58) Field of Classification Search
CPC .......... C08K 5/521; C08K 5/101; C08K 5/20; C08K 5/0025; C08K 5/13; C08K 5/04; C08L 27/16; C08L 27/18; C08L 27/12; C08L 2205/025; C08L 2205/02; C08L 2203/30; C09K 3/10
See application file for complete search history.

(56) References Cited

U.S. PATENT DOCUMENTS

| | | | |
|---|---|---|---|
| 5,508,355 A | 4/1996 | Toda et al. | |
| 5,891,941 A † | 4/1999 | Tanaka | |
| 2011/0009568 A1 | 1/2011 | Okazaki et al. | |
| 2012/0077925 A1 | 3/2012 | Terada et al. | |
| 2014/0228482 A1* | 8/2014 | Ota ........................... | B29B 7/18 523/351 |
| 2014/0288226 A1* | 9/2014 | Ota ......................... | B29B 7/826 524/495 |
| 2015/0031822 A1* | 1/2015 | Ota ......................... | C08K 3/04 524/546 |
| 2015/0330537 A1* | 11/2015 | Ota ......................... | C08L 27/12 428/36.8 |
| 2017/0218173 A1 | 8/2017 | Yamada et al. | |

FOREIGN PATENT DOCUMENTS

| | | | | | |
|---|---|---|---|---|---|
| CN | 104629159 | A | * | 5/2015 | ............. C08J 3/246 |
| CN | 106479008 | A | * | 3/2017 | |
| JP | H10-138267 | A | | 5/1998 | |
| JP | 2003-327768 | A | | 11/2003 | |
| JP | 2018-009109 | A | | 1/2018 | |
| WO | WO 2009/116451 | A1 | | 9/2009 | |
| WO | WO 2012/026557 | A1 | | 3/2012 | |
| WO | WO 2015/133573 | A1 | | 9/2015 | |
| WO | WO 2016/084862 | A1 | | 6/2016 | |
| WO | WO 2017/145920 | A1 | | 8/2017 | |

OTHER PUBLICATIONS

English machine translation of CN 106479008 (Year: 2017).*
English Machine Translation of CN 104629159 (Year: 2015).*
Extended European Search Report for corresponding European Application No. 18817665.5, dated Apr. 28, 2020.
International Search Report and Written Opinion for Inti. Application No. PCT/JP2018/020620, dated Jul. 31, 2018.

\* cited by examiner
† cited by third party

*Primary Examiner* — Angela C Scott
(74) *Attorney, Agent, or Firm* — The Marbury Law Group, PLLC

(57) ABSTRACT

Provided are a fluororubber composition maintaining rubber properties and excellent in flowability and mold releasability as well as capable of reducing a cross-linking time when molded, and a fluororubber sealing material formed of the fluororubber composition. The fluororubber composition contains a polyol cross-linkable based fluororubber; an aliphatic acid amide based compound; at least one member selected from a phosphoric acid ester based compound, an aliphatic acid ester based compound and a fluorine-containing based compound; and a polyol based cross-linking agent. The fluororubber sealing material is formed of the fluororubber composition.

4 Claims, No Drawings ly, in the fluororubber composition of the present invention, preferably a content of the aliphatic acid
FLUORORUBBER COMPOSITION AND FLUORORUBBER SEALING MATERIAL

RELATED APPLICATIONS

This application is a national phase entry of international patent application PCT/JP2018/020620 filed May 29, 2018, which claims benefit of priority to Japanese Application Serial No. 2017-115390, filed Jun. 12, 2017, the entire disclosures of which are incorporated herein by reference in their entireties.

TECHNICAL FIELD

The present invention relates to a fluororubber composition and a fluororubber sealing material formed of the fluororubber composition.

BACKGROUND ART

A fluororubber has excellent properties in a heat-resistance, an oil-resistance and a chemical-resistance or the like, whereas a material price thereof is comparatively high. Further, a fluororubber tends to have low processability prior to a molding step, allowing an increase in a process cost thereof. Hereby, a manufacturer of rubber parts has continued significant efforts to achieve various refinements in order to reduce a manufacturing cost of a fluororubber product.

One approach for reducing a manufacturing cost is to replace a raw material currently used with a low-priced material. However, replacement to a low-priced material while satisfying product performance may be sometimes difficult. Particularly, in case of a functional rubber part, it may be often difficult to secure the product quality.

Another approach for reducing a manufacturing cost is to attain improvement in the processability. In particular, examining reduction of a cross-linking time, improving mold releasability as well as dimensional stability and reducing burr generation in the molding step are directly effective on the productivity of products. Therefore, such examinations and improvement may be expected leading to the cost saving.

For improving the processability as mentioned above, an additional approach for introducing a new facility may be considered. However, this approach is not so easy as the introduction of a new facility largely affects the production cost. Therefore, in many cases, such an approach is taken as to improve a formulation of a rubber composition (i.e., compound).

An approach for improving a formulation includes a method for selecting a fluororubber polymer which is considered to have better processability than other fluororubbers. However, this method may have a concern that such a fluororubber polymer is not sufficiently adapted to unique manufacturing steps taken by a rubber component manufacturer. Accordingly, it is needed to improve processability by improving blending of a process aid.

Many methods for improving processability of a fluororubber composition have been disclosed so far. For example, Patent Document 1 discloses a method for improving mold releasability by adding a perfluoropolyether based fluorine oil to a polyol cross-linkable fluororubber, thereby to improve the mold releasability or the like. Further, Patent Document 2 discloses a method for improving moldability such as flowability by including a glycerin ester of unsaturated aliphatic acid in a fluororubber.

CITATION LIST

Patent Document
Patent Document 1: Japanese Patent Unexamined Application Publication No. 2003-327768.
Patent Document 2: International Publication WO 2016/084862.

SUMMARY OF INVENTION

Technical Problem

However, the method described in Patent Document 1 cannot be expected to improve reduction of a cross-linking time. Further, the method described in Patent Document 2 cannot be also expected to improve reduction of a cross-linking time and maintain rubber properties.

A cross-linkage of a fluororubber is mainly formed by cross-linking methods such as a polyol cross-linking, polyamine cross-linking, or peroxide cross-linking method (i.e., organic acid peroxide cross-linkage). Among those cross-linkages, a polyol cross-linkage provides the smallest compression set and produces a fluororubber product excellent in a heat-resistance and moldability. Hereby, the polyol cross-linkage is used in various fields including a sealing material.

The present invention has been developed in view of the above circumstances. Thus, an object of the present invention is to provide a fluororubber composition with maintaining rubber properties, excellent in dimension stability and mold releasability of a molded product as well as capable of reducing a cross-linking time, and a fluororubber sealing material formed of the fluororubber composition.

Solution to Problem

The present inventors have examined various combinations of process aids which have an improvement effect on the respective processing properties and do not deteriorate any of the rubber properties in order to solve the defects as described above. Eventually, the present inventors have found out that a combination of specific types of process aids is effective to solve the defects, thereby realizing the present invention.

That is, the present invention has the following constituents.

A fluororubber composition of the present invention contains a polyol cross-linkable based fluororubber, an aliphatic acid amide based compound, at least one member selected from a phosphoric acid ester based compound, an aliphatic acid ester based compound and fluorine-containing based compound, and a polyol based cross-linking agent.

Further, in the fluororubber composition of the present invention, preferably a total content of the aliphatic acid amide based compound, the phosphoric acid ester based compound, the aliphatic acid ester based compound and the fluoro-containing based compound is set to 0.5~5.0 parts by mass per the polyol cross-linkable based fluororubber of 100 parts by mass.

Moreover, in the fluororubber composition of the present invention, preferably a content of the aliphatic acid amide based compound is set to 0.01~2.5 parts by mass per the polyol cross-linkable based fluororubber of 100 parts by mass.

Furthermore, when the fluororubber composition of the present invention includes the phosphoric acid ester based compound, the aliphatic acid ester based compound or the fluoro-containing based compound, preferably each of the contents thereof is set to 0.1~3.5 parts by mass per the polyol cross-linkable based fluororubber of 100 parts by mass. Further, preferably a total content of the phosphoric acid ester based compound, the aliphatic acid ester based compound and the fluoro-containing based compound is set to 0.3~5.0 parts by mass per the polyol cross-linkable based fluororubber of 100 parts by mass.

Furthermore, the fluororubber sealing material of the present invention is formed of the fluororubber composition.

Advantageous Effects of Invention

The fluororubber composition and fluororubber sealing material of the present invention maintain rubber properties, and are excellent in the dimension stability and mold releasability of the molded product as well as capable of reducing the cross-linking time.

DETAILED DESCRIPTION OF EMBODIMENTS

Hereinafter, embodiments of the present invention will be described in detail. However, a scope of the present invention is not limited to those embodiments shown as examples described below.

The present inventors have focused on dimension stability, mold releasability and a cross-linking rate among the characteristics of the processability demanded for the fluororubber composition. Here, it is difficult to apply only a single type of process aid to the improvement in those plurality types of characteristics. Therefore, the present inventors have examined how to solve the above described disadvantages. That is, such examinations have been carried out by selecting process aids that effectively improve the above respective characteristics and do not deteriorate the rubber properties, and then by using a plurality of the selected process aids in combination.

Here, an aliphatic acid amide based compound is effective for improving the mold releasability and cross-linking rate at the time of molding. However, such an aliphatic acid amide based compound is not always effective for improving dimension stability of a cross-linked molded article associated with flowability. Therefore, it has been required to select process aids that not only improve the dimension stability but also little affect the rubber properties. Eventually, examinations of various process aids having such performance have resulted in findings that a phosphoric acid ester compound, an aliphatic acid ester compound and a fluorine-containing based compound are effective for the improvement.

It should noted that independent use of the phosphoric acid ester based compound, aliphatic acid ester based compound and fluorine-containing based compound cannot improve the processability of the fluororubber composition in a good balance. By contrast, combinational use of those compounds with the aliphatic acid amide compound can exert a synergistic effect, allowing the rubber properties of the fluororubber composition to be maintained and the processability to be simultaneously improved in a good balance.

The fluororubber composition of the present invention includes the polyol cross-linkable based fluororubber; the aliphatic acid amide based compound; at least one member selected from the phosphoric acid ester based compound, aliphatic acid ester based compound and fluorine-containing based compound; and the polyol based cross-linking agent.

Next, each of the materials forming the fluororubber composition will be described more specifically.

(Polyol Cross-Linkable Based Fluororubber)

A polyol cross-linkable based fluororubber is a fluororubber cross-linkable by a polyol based cross-linking agent. A polymer or a co-polymer of one type or two or more types of fluorine-containing olefin monomers may be used for a polyol cross-linkable based fluororubber. The fluorine-containing olefin monomer includes, for example, vinylidene fluoride, hexafluoropropylene, pentafluoropropylene, trifluoroethylene, trifluorochloroethylene, tetrafluoroethylene, vinyl fluoride, perfluoroacrylic acid ester, acrylic acid perfluoroalkyl ester, perfluoromethyl vinyl ether, and perfluoropropyl vinyl ether or the like. Generally, a polyol cross-linked fluororubber is excellent in the heat-resistance and compression set.

General examples of the polyol cross-linkable fluororubber include, for example, vinylidene fluoride-hexafluoropropylene 2 dimensional co-polymer (an abbreviation: VDF-HFP), tetrafluoroethylene-propylene 2 dimensional co-polymer (an abbreviation: TFE-P), vinylidene fluoride hexafluoropropylene-tetrafluoroethylene 3 dimensional co-polymer (an abbreviation: VDF-HFP-TFE) or the like. Those fluororubbers can be obtained by the methods known in the prior art such as solution polymerization, suspension polymerization or emulsion polymerization, and available as a commercial product (e.g., Viton® A500, DuPont).

(Aliphatic Acid Amide Based Compound)

An aliphatic acid amide based compound is used as a lubricant for a rubber composition. Examples of the aliphatic acid amide based compound include lauric amide, stearic amide, oleic amide, behenic amide, erucic amide, methylene bisstearylamide, ethylene bisstearylamide, ethylene bisoleylamide, hexamethylene bisstearylamide, and palmitic amide.

Preferably, a content of the aliphatic acid amide based compound is set to 0.01~2.5 parts by mass per the polyol cross-linkable fluororubber of 100 parts by mass, more preferably 0.1~1.5 parts by mass. When the content is in the range, it is possible to add an improvement in appropriate mold releasability and an increase in a cross-linking rate to the fluororubber composition.

(Phosphoric Acid Ester Based Compound)

A phosphoric acid ester based compound is used as a plasticizer for a rubber composition. Examples of the phosphoric acid ester based compound include trimethyl phosphate, triethyl phosphate, tripropyl phosphate, tributyl phosphate, tributoxyethyl phosphate, 2-ethylhexyl phosphate, tricresyl phosphate, polyoxyethylene stearyl ether phosphate or the like.

(Aliphatic Acid Ester Based Compound)

An aliphatic acid ester based compound is used as a lubricant for a rubber composition. Examples of the aliphatic acid ester based compound include methyl laurate, methyl stearate, methyl oleate, isopropyl myristate, isopropyl palumitate, butyl palumitate, butyl stearate, 2-ethylhexyl palumitate, 2-ethylhexyl oleate, pentaerythritol stearate, and myricyl cerotate or the like.

(Fluorine-Containing Based Compound)

A fluorine-containing based compound is used as a lubricant and a mold release agent for a rubber composition. Examples of the fluorine-containing based compound include polytetrafluoroethylene (PTFE), ethylene/tetrafluoroethylene co-polymer (ETFE), polyfluorovinylidene (PVdF), and perfluoroalkyl ether or the like.

A total content of the aliphatic acid amide based compound, phosphoric acid ester based compound, aliphatic acid ester based compound and fluorine-containing based compound is preferably set to 0.5~5.0 parts by mass per the polyol cross-linkable based fluororubber of 100 parts by mass, more preferably 0.5~4.0 parts by mass. When the total content is in the range, it is possible to provide the fluororubber composition with an improvement in the appropriate mold releasability, increase in the cross-linking rate and improvement in the dimension stability in a god balance.

When the polyol cross-linkable based fluororubber includes the phosphoric acid ester based compound, the aliphatic acid ester based compound or the fluorine-containing based compound, respective contents thereof are preferably set to 0.1~3.5 parts by mass per the polyol cross-linkable based fluororubber of 100 parts by mass, more preferably 0.3~2.5 parts by mass. When the respective contents are in the range, it is possible to add appropriate improvement in dimension stability to the fluororubber composition.

Preferably, a total content of the phosphoric acid ester based compound, aliphatic acid ester based compound and fluorine-containing based compound is set to 0.3~5.0 parts by mass per the polyol cross-linkable fluororubber of 100 parts by mass, more preferably 0.5~3.5 parts by mass. When the total content is in the range, it is possible to add appropriate improvement in dimension stability to the fluororubber composition.

(Polyol Based Cross-Linking Agent)

A polyol based cross-linking agents used for cross-linking the polyol cross-linkable based fluororubber preferably includes bisphenol compounds. More specifically, such bisphenol compounds include, for example, polyhydroxy aromatic compounds such as 2,2-bis(4-hydroxyphenyl)propane [Bisphenol A], 2,2-bis(4-hydroxyphenyl)perfluoropropane [Bisphenol AF], bis(4-hydroxyphenyl)sulfone [Bisphenol S], Bisphenol A-bis (di-phenylphosphate), 4,4'-dihydroxydiphenyl, 4,4'-dihydroxydiphenyl-methane, 2,2-bis(4-hydroxyphenyl)butane. Preferable examples are Bisphenol A and Bisphenol AF or the like. The polyol based cross-linking agent may have a form of alkali metal salt or alkali-earth metal salt. The polyol based cross-linking agent may be blended as a masterbatch mixed with a raw material rubber or the like. A commercially available masterbatch includes, for example, Curative VC #30 (DuPont Dow Elastomers LLC.; including Bisphenol AF at 50 wt %).

A content of the polyol based cross-linking agent is preferably set to 0.4~20 parts by mass per the polyol cross-linkable based fluororubber 100 parts by mass, more preferably 1~10 parts by mass. The polyol based cross-linking agent may be blended as a masterbatch mixed with a raw material rubber or the like.

(Fluororubber Composition)

A fluororubber composition of the present embodiment may be appropriately blended further with known additives in the range that does not inhibit the effects of the present embodiment, as necessary. For example, such additives include a cross-linking promoter, a cross-linking aid, a cross-linking promoter aid, a rubber reinforcer, a filler, a plasticizer, a softener, an antioxidant agent, a process aid, a foaming agent, a foaming agent aid, a coloring agent, a dispersion agent, a flame retardant, a tackifier, a mold release agent, powder of various types of metals, a thermoplastic resin, a rubber and short fibers or the like.

As for a cross-linking promoter, used are a quarternary ammonium salt and a quarternary phosphonium salt and so on. The quarternary ammonium salt includes, for example, 5-benzyl-1,5-diazabicyclo [4.3.0]-5-nonenium tetrafluoroborate, 8-methyl-1,8-diazabicyclo [5.4.0]-7-undecenium chloride, 8-ethyl-1,8-diazabicyclo[5.4.0]-7-undecenium bromide or the like. The quarternary phosphonium salt includes, for example, tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, trioctylbenzylphosphonium chloride, trioctylmethylphosphonium bromide, trioctylethylphosphonium acetate, trioctylethylphosphonium dimethylphosphate, tetraoctylphosphonium chloride, cetyldimethylbenzylphosphonium chloride or the like.

Any production device known in the prior art may be used for manufacturing the fluororubber composition. More specifically, used are a closed type kneading device such as a kneader, a Banbury mixer, an intermix, a planetarium mixer and an open type kneading device such as an open roll mill.

(Molding of Fluororubber Composition)

Any production device known in the prior art may be used for producing a cross-linked molded article by molding and cross-linking the fluororubber composition. Specifically, the fluororubber composition is charged inside a cavity with a predetermined shape by using an injection molding device, a compression molding device or a cross-linking press machine. Then, the composition is thermally cross-linked under appropriate conditions to produce a cross-linked molded article. As necessary, the resulting article is further subjected to a second cross-linking process.

The fluororubber composition of the present embodiment may be used for various applications. For example, such applications include various types of sealing materials (e.g., O-ring, packing, gasket and diaphragm), a hose, an anti-vibration rubber and a belt. Among those various applications, a sealing material is a representative one capable of exerting the advantageous effects of the present embodiment.

EXAMPLES

Hereinafter, the present invention will be described more specifically referring to Examples and Comparative Examples. However, the present invention is not limited to those Examples.

(Raw Materials of Fluororubber Composition)

The following materials were used for raw materials of the fluororubber composition.

Polyol Cross-linkable Based Fluororubber: Vinylidene fluoride-hexafluoropropylene 2 dimensional co-polymer, 3M, Dyneon® FC2230.

Cross-linking Agent: Polyol based cross-linking agent, Tokyo Chemical Industry Co., Ltd., Bisphenol AF.

Cross-linking Promoter: Quarternary phosphonium salt masterbatch, DuPont, Curative VC #20.

Cross-linking Aid: Magnesium oxide, Kyowa Chemical Industry Co., Ltd., Kyowamag® #150.

Cross-linking Promoter Aid: Calcium hydroxide, Ohmi Chemical Industry Co., Ltd., CALDIC® #2000.

Rubber Reinforcer: Carbon black, thermal black, Cancarb Limited, N990.

Process Aid:

(i) Aliphatic acid amide based compound: Nihon Kasei Co., Ltd., Sripacks L.

(ii) Aliphatic acid amide based compound: Tokyo Chemical Industry Co., Ltd., Oleic Amide.

(iii) Phosphoric acid ester based compound: TOHO Chemical Industry Co., Ltd., RL210.

(iv) Aliphatic acid ester based compound: DuPont, VPA #2.

(v) Aliphatic acid ester based compound: King Industries, Deoflow 821.

(vi) Fluorine-containing based compound: Solvay, FPA1.

(vii) Fluorine-containing based compound: Daikin Industries, Ltd., FB962.

(viii) Natural Wax/Aliphatic Acid/Alkylamine/Hydrocarbon Based Resin Compound: Structol, HT290.

(ix) Aliphatic acid metal salt based compound: Kao Corporation, NS-Soap.

(Production of Fluororubber Composition)

In the formulation listed in Table 1 or Table 2, a mixture was kneaded at 100° C. or less for 10~30 min using a 1 L kneader or an open roll kneader. Then, the mixture was passed through an open roll thereby to prepare an uncross-linked rubber sheet. Here, an attainable temperature of the 1 L kneader was 90° C. Using the uncross-linked rubber sheet thus obtained, cross-linking characteristics described in JIS K6300-2:2001 at 180° C. were measured.

Further, an uncross-linked rubber composition was cross-linked and molded (i.e., first cross-linking) into a shape of the bearing number G25 of a fixing O-ring described in JIS B2401-1:2012 by using a press molding machine under the conditions of 180° C.×6 min. After that, the resulting molded product was subjected to a post curing process under the conditions of 230° C.×24 hr. The resulting O-ring thus obtained was evaluated in compression set. Moreover, each of the following items was evaluated (i.e., Examples 1~7, Comparative Examples 1~8).

(Cross-Linking Time)

A 90% cross-linking time t90 (sec) at 180° C. was measured via conforming to JIS K6300-2:2001. Specifically, a difference in cross-linking times (sec) of each sample piece was calculated by subtracting a value of t90 when adding no process aid from a value of t90 when adding the aid. That is, in case of Examples 1~7 and Comparative Examples 2~8, a difference in cross-linking times (sec) was calculated by subtracting the value (i.e., 195) of t90 in Comparative Example 1 from each value of t90(s) in Examples 1~7 and Comparative Examples 2~8.

When a difference in cross-linking times was a negative value smaller than −10 (sec), this condition exerted an effect for increasing the cross-linking rate, resulting in the evaluation of Good.

By contrast, when a difference in cross-linking times was a negative value equal to or larger than −10 (sec), this condition exerted no or little effect for increasing the cross-linking rate, resulting in the evaluation of Poor.

(Dimension Stability)

An O-ring in a shape of the bearing number G25 of a fixing O-ring was molded via conforming to JIS B2401-1: 2012. The resulting O-ring was subjected to a post curing process under the conditions of 230° C.×24 hr. A mean diameter of the O-ring was calculated by measuring diameters of the molded article (n=3). When the mean diameter of the O-ring was in the range of 3.1±0.05 mm, the dimension stability was determined as Good, while otherwise the dimension stability was determined as Poor.

(Mold Releasability)

Mold Releasability: Using a mold with 2×5 cavities in the G25 shape, mold releasability of an O-ring when molded by compression press was evaluated based on the following criteria.

Good: When an O-ring was released, the resistance was small, it was integrally released, and no cut-lines occurred between the product and burrs.

Poor: When an O-ring was released, cut-lines occurred between the product and burrs.

(Compression Set)

A compression set as rubber properties was evaluated by using a cross-linked O-ring. An O-ring in the G25 shape was 2-point cut to prepare semi-circular sample pieces each having a diameter of about 3.1 mm. The sample piece was sandwiched between SUS plates and put into an oven at 175° C. in the 25% compressed condition. Immediately after heated for 70 hr, the sample piece was released from the SUS plates and left at room temperature for 30 min. A compression set of the sample piece was calculated by a change in diameters before and after the experiment. Herein, an experimental method and calculating method were conducted via conforming to JIS K6262: 2013.

As for each sample piece, a difference (%) in compression sets was calculated by subtracting a value of a compression set when adding no process aid to the formulation from a value of a compression set when adding it. That is, in case of Examples 1~7 and Comparative Examples 2~8, a value was calculated by subtracting a value (i.e., 12) of the compression set in Comparative Example 1 from each value of the compression sets in others. When a difference in the compression sets was small than +5(%), the compression set of the sample piece was determined as Good. By contrast, when a difference in the compression sets was equal to or larger than +5(%), the compression set of the sample piece was determined as Poor.

TABLE 1

| Formulation | | | | | EX. 1 | 1 EX.2 | EX. 3 | EX.4 | EX.5 | EX.6 | EX.7 |
|---|---|---|---|---|---|---|---|---|---|---|---|
| Formulation | Fluororubber | Polyol Cross-Likable 2-D Fluororubber | Dyneon FC2230 | Parts By Mass | 100 | 100 | 100 | 100 | 100 | 100 | 100 |
| | Rubber Reinforcer | Carbon Black | N990 | Parts By Mass | 35 | 35 | 35 | 35 | 35 | 35 | 35 |
| | Cross Linking Agent | Polyol Based Cross-Linking | Bisphenol AF | Parts By Mass | 2 | 2 | 2 | 2 | 2 | 2 | 2 |
| | Cross-Linking Promoter | Quaternary Phosphonium Salt Based Masterbatch | VC#20 | Parts By Mass | 1.5 | 1.5 | 1.5 | 1.5 | 1.5 | 1.5 | 1.5 |
| | Cross-Linking Aid | Magnesium Oxide | Kyowamag #150 | Parts By Mass | 3 | 3 | 3 | 3 | 3 | 3 | 3 |
| | Cross-Linking Promoter Aid | Calcium Hydroxide | CALDIC #2000 | Parts By Mass | 5 | 5 | 5 | 5 | 5 | 5 | 5 |
| | Process Aid | Aliphatic Acid Amide Based Compound | Sripacks L | Parts By Mass | 0.6 | 0.6 | — | — | — | 0.3 | — |
| | | Aliphatic Acid Amide Based Compound | Oleic Amide | Parts By Mass | — | — | 0.2 | 0.2 | 0.2 | 0.1 | 0.2 |
| | | Phosphoric Acid Ester Based Compound | RL210 | Parts By Mass | — | — | — | — | 0.7 | — | — |

TABLE 1-continued

|  |  |  |  |  | EX. 1 | EX.2 | EX. 3 | EX.4 | EX.5 | EX.6 | EX.7 |
|---|---|---|---|---|---|---|---|---|---|---|---|
|  |  | Aliphatic Acid Ester Based Compound | VPA#2 | Parts By Mass | 1.0 | — | 1.0 | — | — | 0.5 | — |
|  |  | Aliphatic Acid Ester Based Compound | Deoflow 821 | Parts By Mass | — | 1.5 | — | — | — | — | — |
|  |  | Fluorine-Comtaining Based Compound | FPA1 | Parts By Mass | — | — | 1.5 | 1.5 | — | — | 1.5 |
|  |  | Fluorine-Containing Based Compound | FB962 | Parts By Mass | — | — | — | — | — | 0.5 | — |
|  |  | Natural Wax/Aliphatic Acid/Alkylamine/ Hydrocarbon Based Compound | HT290 | Parts By Mass | — | — | — | — | — | 0.2 | — |
|  |  | Aliphatic Acid Metal Salt Based Compound | NS-Soap | Parts By Mass | — | — | — | — | — | — | 0.2 |
| Evaluation of Peformance | Cross-Linkability | Difference in Cross-Linking | | sec | −16 | −22 | −13 | −15 | −11 | −18 | −18 |
|  | Dimension Stability | Diameter of G25 O-Ring | | mm | 3.14 | 3.15 | 3.11 | 3.13 | 3.14 | 3.13 | 3.11 |
|  | Mold Releasability | Mold Releasability When Molding G25 O-Ring | | | Good | Good | Good | Good | Good | Good | Good |
|  | Rubber Properties | Compression Set | | % | +4 | +4 | +4 | +2 | +3 | +4 | +4 |

TABLE 2

|  |  |  |  |  | COM. EX. 1 | COM. EX. 2 | COM. EX. 3 | COM. EX. 4 | COM. EX. 5 | COM. EX. 6 | COM. EX. 7 | COM. EX. 8 |
|---|---|---|---|---|---|---|---|---|---|---|---|---|
| Formulation | Fluororubber | Polyol Cross-Linkable 2-D Fluororubber | Dyneon PC2230 | Parts By Mass | 100 | 100 | 100 | 100 | 100 | 100 | 100 | 100 |
|  | Rubber Reinforcer | Carbon Black | N990 | Parts By Mass | 35 | 35 | 35 | 35 | 35 | 35 | 35 | 35 |
|  | Cross-Linking Agent | Polyol Based Cross-Linking Agent | Bisphenol AF | Parts By Mass | 2 | 2 | 2 | 2 | 2 | 2 | 2 | 2 |
|  | Cross-Linking Promoter | Quaternary Phosphonium Salt Based Masterbatch | VC#20 | Parts By Mass | 1.5 | 1.5 | 1 5 | 1.5 | 1.5 | 1.5 | 1.5 | 1.5 |
|  | Cross-Linking Aid | Magnesium Oxide | Kyowamag #150 | Parts By Mass | 3 | 3 | 3 | 3 | 3 | 3 | 3 | 3 |
|  | Cross-Linking Promoter Aid | Calcium Hydroxide | CALDIC #2000 | Parts By Mass | 5 | 5 | 5 | 5 | 5 | 5 | 5 | 5 |
|  | Process Aid | Aliphatic Acid Amide Based Compound | Sripacks L | Parts By Mass | — | 1.5 | — | — | — | — | — | — |
|  |  | Aliphatic Acid Amide Based Compound | Oleic Amide | Parts By Mass | — | — | — | — | — | — | 0.5 | — |
|  |  | Phosphoric Acid Ester Based Compound | RL210 | Parts By Mass | — | — | — | — | 1.5 | — | — | — |
|  |  | Aliphatic Acid Ester Based Compound | VPA#2 | Parts By Mass | — | — | 1.5 | — | — | — | — | — |
|  |  | Aliphatic Acid Ester Based Compound | Deoflow 821 | Parts By Mass | — | — | — | — | — | — | — | — |
|  |  | Fluorine-Containing Based Compound | FPA1 | Parts By Mass | — | — | — | 1.5 | — | — | — | — |
|  |  | Fluorine-Contaning Based Compound | FB962 | Parts By Mass | — | — | — | — | — | — | — | — |
|  |  | Natural Wax/ Aliphatic Acid/ Alkylamine/ Hydrocarbon Based Compound | HT290 | Parts By Mass | — | — | — | — | — | 1.5 | 1.5 | — |
|  |  | Aliphatic Acid Metal Salt Based Compound | NS-Soap | Parts By Mass | — | — | — | — | — | — | — | 1.5 |

TABLE 2-continued

|  |  |  |  | COM. EX. 1 | COM. EX. 2 | COM. EX. 3 | COM. EX. 4 | COM. EX. 5 | COM. EX. 6 | COM. EX. 7 | COM. EX. 8 |
|---|---|---|---|---|---|---|---|---|---|---|---|
| Evaluation of Performance | Cross-Linkability | Difference in Cross-Linking Times | sec | (195) | −25 | +10 | +5 | +11 | +13 | −5 | −24 |
| | Dimension Stability | Diameter of G25 O-Ring | mm | 3.17 | 3.18 | 3.15 | 3.14 | 3.13 | 3.12 | 3.13 | 3.18 |
| | Mold Releasability | Mold Releasability When Molding G25 O-Ring | | Poor | Good | Poor | Poor | Good | Poor | Poor | Poor |
| | Rubber Properties | Compression Set | % | (12) | +5 | +4 | +2 | +5 | +11 | +10 | +8 |

As shown by the evaluation results in Tables 1 and 2, all the Examples 1~7 were excellent in the cross-linkability, dimension stability, mold releasability and rubber properties. By contrast, Comparative Examples 1~8 did not satisfy the requirements of the claims, resulting in poor performance on at least one of the cross-linkability, dimension stability, mold releasability and rubber properties.

What is claimed is:

1. A fluororubber composition, comprising:
    a polyol cross-linkable based fluororubber,
    an aliphatic acid amide-based compound,
    an aliphatic acid ester-based compound, and
    a polyol-based cross-linking agent,
    wherein a total content of the aliphatic acid amide-based compound and the aliphatic acid ester-based compound is 0.5-5.0 parts by mass per the polyol cross-linkable based fluororubber of 100 parts by mass.

2. The fluororubber composition according to claim 1, wherein:
    a content of the aliphatic acid amide-based compound is 0.01-2.5 parts by mass per the polyol cross-linkable based fluororubber of 100 parts by mass.

3. The fluororubber composition according to claim 1, wherein:
    a content of the aliphatic acid ester-based compound ranges from 0.1-3.5 parts by mass per the polyol cross-linkable based fluororubber of 100 parts by mass.

4. A fluororubber sealing material formed of the fluororubber composition according to claim 1.

* * * * *